United States Patent [19]
Takarada

[11] 3,778,579
[45] Dec. 11, 1973

[54] ARC CONTROL
[75] Inventor: Eiichi Takarada, Rockford, Ill.
[73] Assignee: Amsted Industries Incorporated, Chicago, Ill.
[22] Filed: Apr. 27, 1972
[21] Appl. No.: 248,271

[52] U.S. Cl............................. 219/69 S, 219/69 C
[51] Int. Cl............................................. B23p 1/08
[58] Field of Search ................ 219/69 C, 69 P, 69 S

[56] References Cited
UNITED STATES PATENTS
3,564,339  2/1971  Katz et al..................... 219/69 C X
3,585,341  6/1971  O'Connor........................ 219/69 G
3,627,967  12/1971 Bertolasi........................ 219/69 S Primary Examiner—R. F. Staubly
Attorney—Walter L. Schlegel, Jr.

[57] ABSTRACT

A toroid senses the time rate of change of current at the gap between an electrode and a workpiece in an electrical discharge machining apparatus. An abnormal time rate of change of current causes a signal to be developed by a Schmitt trigger, which causes interruption of power flow to the gap.

3 Claims, 4 Drawing Figures

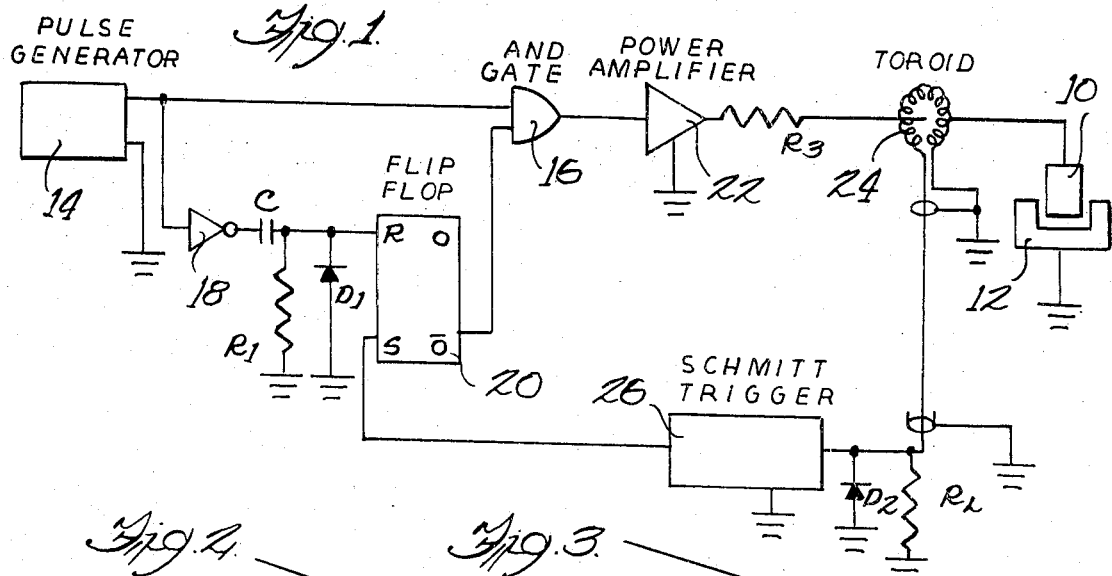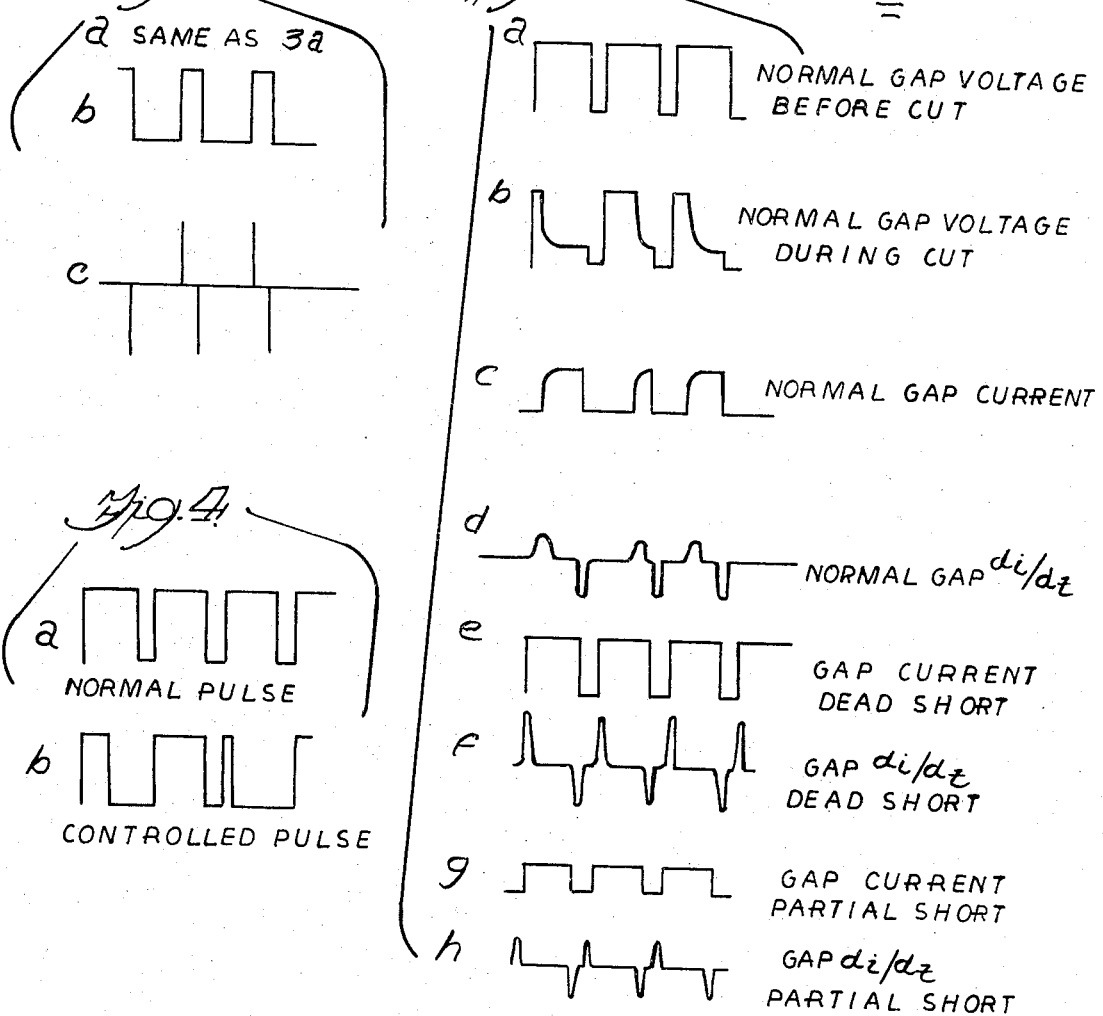

ARC CONTROL

The present invention relates generally to electrical discharge machining. More particularly it relates to sensing abnormal conditions at the gap between an electrode and a workpiece, and responding to such conditions so as to control arcing across the gap.

Electrical discharge machining is a process that utilizes electrical discharges, or sparks, to machine metal. The surface being machined is bombarded with high intensity electrical energy pulses that gradually erode away the stock until the desired configuration is obtained.

To accomplish the machining operation, a machine tool is required to maintain the electrode to workpiece relationship. A power source is required to produce the electrical energy. And a dielectric oil is needed to immerse the cutting action.

The electrical energy discharges are the result of a direct current power pulse produced by the power source and impressed on an electrode held in the machine tool. As the electrode is moved toward the workpiece, the attraction between the negative polarity electrode and positive polarity workpiece increases until the electrical energy overcomes the barrier set up by the dielectric oil and is transferred to the workpiece in the form of a spark. This high energy spark, through vaporization, melting, and an explosive effect, dislodges a minute particle of metal from the workpiece, leaving a small crater. The dislodged particle, or chip, is then washed away by the dielectric oil.

Although the chip and the crater produced by one spark is extremely small, energy pulses can be created by the power source at frequencies which make the total amount of metal removed significant.

The high energy direct current pulses required at the gap are produced by a power supply. These pulses can be delivered directly to the cutting area, or can be fed into capacitors where they are stored before being delivered to the gap in a more intensified form.

Feeding of the electrode into the workpiece as the stock is removed is controlled by electrical feedback from the cutting gap. A reference voltage is established within the power supply, to which the voltage at the gap is compared. As stock is removed, the distance between the electrode and the workpiece is increased, which in turn increases the voltage across the gap. When the gap voltage differs from the reference voltage, a signal is sent to a servo valve and the servo valve actuates a hydraulic cylinder to move the electrode closer to the workpiece and bring the system back into balance.

A gap between the electrode and workpiece is necessary for efficient cutting. Ideally, the electrode never comes into contact with the workpiece. The gap is adjustable and will vary with cutting conditions.

To accurately control the electrical discharges and the resulting metal removal, not only is a gap required between the electrode and the workpiece, but it is also required that the cutting be done in a controlled and constant environment. A dielectric oil is used for this purpose to completely isolate the cutting area.

The dielectric isolating the cutting action from the air has three prime functions; cooling the workpiece, flushing residue from the cutting gap, and acting as a constant and controllable opposition to the electrical discharges.

To accurately control the operation, the dielectric must act as an insulator and then must break down when a specific voltage is reached. When this "breakdown" occurs, the dielectric becomes ionized and permits current to flow between the electrode and the workpiece.

In the event of a short between the electrode and the workpiece, undesirable arcing will occur. Such a short may develop because of the presence of debris, because the surface of the workpiece is rough, or because the electrode momentarily makes contact with the workpiece. In such an event arcing or the resulting heat generated therefrom may damage the workpiece.

It is conventional practice in electrical discharge machining apparatus to provide means for detecting the low voltage existing in the presence of a short, and to interrupt delivery of power to the gap. Unfortunately, once the short is established, damage to the workpiece may be considerable. Furthermore, the detecting means may sense only a dead short and not a partial short, this too could result in damage to the workpiece.

If the gap is shorted, a higher than normal current will flow, and unless the power is shut off immediately, the total energy delivered to the workpiece will be greater than the energy delivered normally. The greater energy will cause rough spots on the surface of the workpiece and may result in damage thereto.

To avoid this danger the present invention involves detecting an abnormal time rate of change of current at the gap present as a short begins to develop, and controlling the delivery of power to the gap in response thereto.

Accordingly, an object of this invention is to provide an improved detector for sensing short circuit conditions at the gap in an electrical discharge machining apparatus, and to control the delivery of power to the gap in response thereto.

Another object of this invention is to provide a fault detector for sensing an abnormal time rate of change of current as a short develops at the gap in an electrical discharge machining apparatus.

Still another object of this invention is to provide a toroid for sensing the time rate of change of current at the gap in an electrical discharge machining apparatus, and to control the flow of power to the gap in response to a predetermined output from the toroid.

Additional objects and advantages of this invention will be apparent to those skilled in the art upon consideration of the disclosure, including the drawing in which;

FIG. 1 is a simplified electrical schematic diagram of the power supply for an electrical discharge machining apparatus of the present invention;

FIG. 2 is a timing diagram illustrating comparable signals in the circuit;

FIG. 3 is a timing diagram illustrating the relationship of various functions developed in the circuit; and FIG. 4 is a timing diagram illustrating voltage pulses both normally and as a result of an abnormal condition.

Turning now to the drawing and particularly to FIG. 1, a simplified electrical schematic diagram of an electrical discharge machining power supply is shown for illustrative purposes. Specifically, one side of the power supply is coupled to an electrode 10, the other side to a workpiece 12. The electrode 10 and workpiece 12 are maintained in spaced relationship to define the gap across which sparks travel from the electrode 10 to the workpiece 12.

Pulses having a predetermined frequency and duty cycle are supplied by a pulse generator 14. These pulses, shown at FIG. 2a, are fed into one input of an AND gate 16. It may be assumed that ON and OFF conditions are represented by the terms $logic_1$ and $logic_0$, respectively. Pulses supplied by pulse generator 14 are also fed to an invertor 18. The output of invertor 18, shown at FIG. 2b, is differentiated by the $R_1C$ circuit. The resulting impulse is shown at FIG. 2c. The negative portion of this impulse is clipped by diode $D_1$ and the positive portion of this impulse thereof applied to the reset of flip-flop 20. An output of flip-flop 20 is connected to the other input of AND gate 16.

Under normal conditions, when the output of pulse generator 14 and flip-flop 20 are both in the $logic_1$ state, a pulse, shown at FIG. 2a, will appear at the output of the AND gate. If either the output of pulse generator 14 or flip-flop 20 is in the $logic_0$ state, or if both of them are in the $logic_0$ state, no pulse will appear at the output of AND gate 16.

The pulses are amplified by power amplifier 22, of conventional design, and the output therefrom is fed through current limiting resistor $R_3$ to electrode 10, and across the gap to machine workpiece 12. These pulses are shown at FIG. 3a as the voltage across the gap before the start of a cut, and at FIG. 3b after the start of a cut with no gap short. At this time the current across the gap is as shown at FIG. 3c, and the time rate of change of current as at FIG. 3d.

Without the control provided herein, the event of a dead short across the gap the current and time rate of change of current would be as shown at FIGS. 3e and 3f, respectively. Similarly, a partial short would result in a current as shown at FIG. 3g and a time rate of change of current as shown at FIG. 3h.

A comparison of FIG. 3d with FIGS. 3f and 3h show that the time rate of change of current builds up abnormally at the very beginning of the development of a gap short.

A toroid 24 is provided to sense this time rate of change of current. Such a toroid may be an Arnold U.S. Pat. No. 324117.2 core with coils of 25 turns of wire around it, although the precise construction of the toroid will be determined by circuit design considerations. The output from toroid 24 is fed across a resistor $R_2$ to the input of a conventional Schmitt trigger 26. The threshold value of the input to Schmitt trigger 26 is determined by a diode $D_2$. Output from the Schmitt trigger is applied to the set of flip-flop 20.

Normal ionization in the gap between electrode 10 and workpiece 12 is a gradual process. Ionization starts with a minute flash across the gap. Heat develops and ionization increases until saturation, determined by pulse voltage and resistor $R_3$, is reached. Even if the current level at saturation is high, the time rate of change of current during normal ionization is relatively low, as shown in FIG. 3d. However, if a pulse is applied when the gap is shorted or partially shorted, the current will reach its saturation level almost instantaneously, as shown in FIGS. 3f and 3h. Thus the time rate of change of current will be relatively high.

It is this relatively high time rate of change of current that is sensed by toroid 24 and used to activate the arc control circuit.

When toroid 24 senses the abnormal condition, its output is fed to Schmitt trigger 26. Output from Schmitt trigger 26 will set flip-flop 20, causing its output to appear as $logic_0$ at AND gate 16. Immediately, the flow of power to electrode 10 is interrupted until such time as the output from toroid 24 drops below the threshold value and normal conditions obtain and the output from flip-flop 20 again appears as $logic_1$.

Under normal conditions the output from AND gate 16 will appear as shown in FIG. 4a. This will vary under abnormal conditions as suggested by FIG. 4b.

Although this invention is described with reference to a single illustrated embodiment, it is understood that the intent is not to limit it to that embodiment but rather to cover all modifications, alternatives and equivalents within the spirit and scope of the invention as defined by the claims.

What is claimed is:

1. In an electrical discharge machining assembly including pulse-generating means for supplying pulses of a predetermined frequency and duty cycle, an electrode and a conductive workpiece defining therebetween an ionizable gap, and a circuit coupling said pulse-generating means with said electrode and workpiece whereby discrete discharges are passed through said gap to machine said workpiece, the improvement comprising means coupled with said circuit for detecting the time rate of change of current at said gap, and means coupled with said detecting means for interrupting said discrete discharges in response to detection of the time rate of change of current at said gap above a preselected value.

2. The invention according to claim 1, said detecting means including a toroid inducing a signal current in response to detection of the time rate of change of current at said gap, said interrupting means including means for supplying a signal in response to induced signal current above a preselected value and means responsive to the presence of said signal for interrupting said discrete discharges.

3. In an electrical discharge machining assembly, the combination comprising a pulse-generator, an electrode and a conductive workpiece defining therebetween an ionizable gap, and a circuit coupling said pulse-generator with said electrode and workpiece whereby discrete discharges are passed through said gap to machine said workpiece, said circuit including an invertor coupled with said pulse-generator for inverting its voltage pulses, means for differentiating the inverted pulses, a flip-flop having its reset responsive to the inverted and differentiated pulses, an AND gate having inputs coupled with said pulse-generator and said flip-flop and having an output coupled with said electrode, toroid means for sensing the time rate of change of current at said gap, and a Schmitt trigger actuated by said toroid to produce a signal representative of the time rate of change of current at said gap above a predetermined level, said flip-flop having its set responsive to the signal, whereby a time rate of change of current at said gap above the predetermined level causes the flip-flop to interrupt the pulses beyond said AND gate.

* * * * *

Disclaimer and Dedication 3,778,579.—*Eiichi Takarada*, Rockford, Ill.
 ARC CONTROL. Patent dated Dec. 11, 1973. Disclaimer filed Mar. 5, 1975, by the assignee, *Amsted Industries Incorporated*.

Hereby disclaims and dedicates to the Public the remaining term of said patent.

[*Official Gazette June 10, 1975.*]